United States Patent
Kazenas

(10) Patent No.: US 8,494,938 B1
(45) Date of Patent: Jul. 23, 2013

(54) CLAIMS CARD

(75) Inventor: Joseph A. Kazenas, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 75 days.

(21) Appl. No.: 12/965,477

(22) Filed: Dec. 10, 2010

(51) Int. Cl.
*G06Q 40/00* (2006.01)

(52) U.S. Cl.
USPC .................................. 705/35; 705/4

(58) Field of Classification Search
USPC .................................. 705/4, 35–40
See application file for complete search history.

(56) References Cited

U.S. PATENT DOCUMENTS

| | | | |
|---|---|---|---|
| 6,820,058 B2 | 11/2004 | Wood et al. | |
| 7,246,068 B2 | 7/2007 | Thomas, Jr. | |
| 7,743,979 B2 | 6/2010 | Fredman | |
| 8,010,389 B2 * | 8/2011 | Wait et al. | 705/4 |
| 2010/0145738 A1 | 6/2010 | Bush | |

OTHER PUBLICATIONS

Insure.com, "Cards Give Policyholders Quick Claims Cash," 4 pages, Feb. 17, 2003.
Edenred, "Insurance Claim Card: Ticket Payback," 1 page, downloaded Oct. 14, 2010.

* cited by examiner

*Primary Examiner* — Thu Thao Havan
(74) *Attorney, Agent, or Firm* — Perkins Coie LLP

(57) ABSTRACT

Systems and methods for processing insurance claims using a claims card are provided. In accordance with some embodiments, a notice of loss is received. The notice of loss can contain information regarding the insured property, policy information, member information, witness names and contact information, witness statements, police report numbers, date of loss, time of loss, nature of the loss, and/or other information. A determination of liability coverage can then be made by accessing a membership database to retrieve the insurance policy. If the loss is determined to be covered by, or at least within the coverage of, the insurance policy, a claims card can be activated, delivered, or given to an insured accident victim under conditions where liability coverage, claims record, and the liability issues for the accident are sufficiently clear that to indicate that the insurance company will be paying for loss related items.

20 Claims, 6 Drawing Sheets

CLAIMS CARD

TECHNICAL FIELD

Various embodiments of the present invention generally relate to insurance claim processing. More specifically, various embodiments of the present invention relate to an insurance claims card.

BACKGROUND

Insurance is a risk management tool that typically involves aggregating funds received through premiums payments from many people. These aggregated funds are used to pay for covered losses. Insurance companies often evaluate the risk of an individual through the application process. An applicant for insurance generally must meet certain criteria set forth by the company in order to be insured. Depending on the type of insurance being applied for, the insurance company can require medical exams, medical history, background checks, driving history, credit checks, and other types of information to assist in the evaluation of the individual applying for the insurance coverage. Based on the information gathered during the application process, the insurance carrier can decide to issue an insurance policy laying out the details of coverage such as terms, obligations, excluded events, covered events, premium amounts, and the like. Typically, the more risk associated with an individual, the higher the premiums the insurance companies will require the individual to pay. In some cases, an insurance company may be unwilling to even insure the individual.

A reserve fund is created from the aggregated funds with a sufficient present value to cover the expected value of future claims. The reserve funds are typically invested in less liquid assets with growth potential. This is in contrast to unsettled liabilities which must be kept in more liquid investments until the liability is settled. As a result, there is a benefit in keeping a maximum balance in the reserve fund. The faster the claim is settled, the faster excess funds can be returned to reserve for potentially higher returns.

SUMMARY

Systems and methods are described for using an insurance claim card. In some embodiments, a notice of loss is received. The notice of loss relates to a member with insurance coverage provided by a membership institution. The insurance coverage typically has a coverage amount. An expected loss amount based on historical claim data from similar losses and the coverage amount can be withdrawn from a reserve account of the membership institution upon receiving the notice of loss. A payment device (e.g., a membership card or an insurance card) can then be activated that allows access to the expected loss amount withdrawn from the reserve account. The payment device allows the member to directly make loss related payments consistent with the insurance coverage. Once a final settlement amount has been determined, a reserve refund amount can be computed which is the difference between the amount withdrawn from the reserve and the final settlement amount. The reserve refund amount is then refunded to the reserve account.

In some embodiments the notice of loss is automatically generated by a remote diagnostic system or by a user through a graphical user interface or custom application. For example, a remote diagnostic system can be installed in an automobile that automatically generates the notice of loss in response to a notice generating event (e.g., a collision). The notice of loss can provide automobile information, membership information, and accident information gathered by the remote diagnostic system. Examples of accident information can include information about whether the airbags were deployed, speed of vehicle, if the vehicle was braking, accelerations created by an impact, impact zones, and/or other information.

The use of the payment device can be monitored while a determination of liability is pending. This allows the insurance provider to ensure the payments are loss related payments. For example, in some cases, the use of the payment device can be monitored using merchant category code (MCC) data and level 3 data. As another example, a membership database can be used to determine liability coverage, the coverage amount, and a member banking account at the membership institution. Any payment made with the payment device that is determined to not be a loss related payment can be withdrawn from the member banking account.

Embodiments of the present invention also include computer-readable storage media containing sets of instructions to cause one or more processors to perform the methods, variations of the methods, and other operations described herein.

In various embodiments of the present invention, a system can include a notice receiving module, an estimation module, a reserve module, an activation module, and a refund module. The notice receiving module can receive a notice of loss with information about a loss relating to a member with insurance coverage provided by a membership institution. The estimation module can receive information about the loss from the notice receiving module. Using this information, the estimation module can determine an expected loss amount based on historical claim data for similar losses. The reserve module can withdraw the expected loss amount from a reserve account of the membership institution. The activation module can activate a payment device with access to the expected loss amount withdrawn from the reserve account. The payment device allows the member to directly make loss related payments consistent with the insurance coverage. The refund module can determine a reserve refund amount by taking the difference between a final settlement amount and the expected loss amount withdrawn from the reserve account. Once the reserve refund amount is determined, the refund module can refund the reserve refund amount to the reserve account.

Embodiments of the system can also include one or more of a member database, an account module, a spending module, a payment device generation module, and/or a mailing module. The member database can store information regarding the insurance coverage of a plurality of members and a member banking account at the membership institution. The account module can identify the banking account associated with the member and withdraw any payment made with the payment device that is determined to not be a loss related payment.

In some embodiments, the spending module can be used to monitor (e.g., with MCC data and level 3 data) the use of the payment device while a determination of liability is pending to ensure the payments are loss related payments. The estimation module can also generate a set of typical claim categories and typical claim amounts for each category that associated with the loss. In these cases, the monitoring module can categorize each transaction generated by the payment devices and notifies an auditor when spending within one or more of the claim categories exceeds a percentage of the typical claim amounts. The payment device generation module can create a payment device in response to a generation indicator provided by the estimation module. The mailing module then mails (or electronically delivers) the payment device to the member.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present invention will be described and explained through the use of the accompanying drawings in which.

Figure 1:
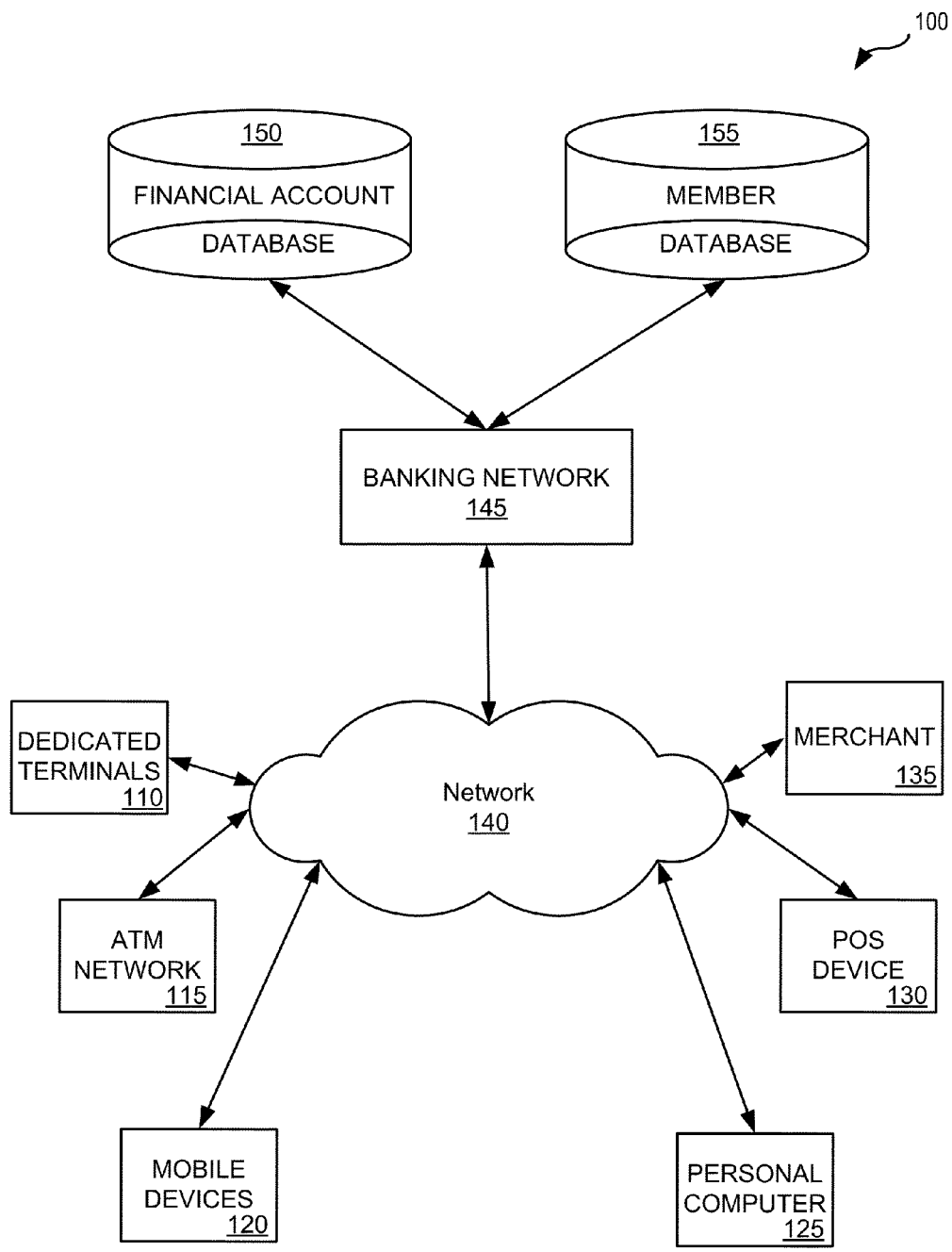
FIG. 1 illustrates an example of an operating environment in which some embodiments of the present invention may be utilized.

The drawings have not necessarily been drawn to scale. For example, the dimensions of some of the elements in the figures may be expanded or reduced to help improve the understanding of the embodiments of the present invention. Similarly, some components and/or operations may be separated into different blocks or combined into a single block for the purposes of discussion of some of the embodiments of the present invention. Moreover, while the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

Various embodiments of the present invention generally relate to insurance claim processing. More specifically, various embodiments of the present invention generally relate to systems and methods for activating and using an insurance claims card. The claims card is a card or other payment device (e.g., an electronic payment device delivered to a mobile phone) that can be used directly by an insured member to make payments to merchants and/or service providers that are related to an insurance claim. The claims card is activated, delivered, or given to an insured accident victim under conditions where liability coverage, claim record, and liability issues for the accident are sufficiently clear to indicate that the insurance company will be paying for claim items (e.g., the insured's medical bills).

In accordance with some embodiments, a notice of loss relating to the insured member can be received by a phone submission, an Internet submission, from an application on a mobile device, from a remote monitoring system, or from another communications system. The notice of loss can contain information regarding the insured property (e.g., vehicle, home, or other property), policy information, member information, witness names and contact information, witness statements, police report numbers, date of loss, time of loss, nature of the loss, and other information related to the loss. A determination of liability coverage can then be made by accessing a membership database to retrieve the insurance policy. If the loss is determined to be covered by, or at least within the coverage of, the insurance policy, a claims card can be activated allowing the insured to make loss related payments.

For example, in an automobile accident, the claims card can be used like a credit card to immediately pay the incoming bills from the hospital, the ambulance company, the medics, the emergency room, the doctor, the specialists, and any other bills received over the coming months. The charges made by the insured member to the claims card can be monitored and/or audited through merchant category code (MCC) data and/or through level 3 credit card processing data. Data available through level 3 processing includes standard info (e.g., credit card number & exp, billing address, zip code & invoice number), customer code, sales tax, and line item details (e.g., product/service ID, product/service description, quantity, item amount, and unit of measure).

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

FIG. 1 illustrates an example of an operating environment 100 in which some embodiments of the present invention may be utilized. The embodiments of the present invention illustrated in FIG. 1 allow user interactions through various points of interaction such as, but not limited to, dedicated terminals 110 (e.g., public terminal or kiosk), ATM networks 115 (e.g., interbank ATM network and intrabank ATM networks), mobile devices 120 (e.g., mobile phone), personal computers 125, point of sale (POS) devices 130, and merchants 135. These points of interaction can include mechanisms, applications, modules, and/or components for claims submissions and claim card uses. Network 140 connects the points of interaction to banking network 145 and may run one or more applications or clients that allow a user to interact with the banking network (e.g., claims submissions programs and transaction processing).

Dedicated terminals 110 such as public terminals/kiosks may be computers available to the public and/or specially designed kiosks that interact with banking network 140. ATM networks 115 can be any set of ATMs in an interbank ATM network and/or intrabank ATM network. Mobile devices 120 may be cellular phones, smart phones (a smart phone being a cellular phone that has capabilities and features such as, but not limited to, internet access, a full keyboard, email access, Wi-Fi connection capabilities, BLUETOOTH connectivity, or any other functionality of a computer), tablet computers (a portable computer having a touch interface), netbooks, laptops possibly with a wireless connection (such as an 802.11a/ b/g connection or mobile broadband connection, such as via a 3G or 4G wireless network). Personal computers 125 may be any computer (e.g., desktop computers, laptop computers, netbooks, tablet computers, Internet-enabled television devices, game consoles, etc.) connected to network 140.

POS devices 130 can be any device used as a checkout or payment receiving mechanism for merchant 135 or service provider such as a hospital, ambulance company, doctor, automobile repair shop, pharmacy, clothing store, and others. For example, POS device 130 can be a terminal located at merchant 135, a computer-based interface such as a webpage or custom application, a telephone payment system, and others.

Banking network 145 may include any number of membership organizations, banks, credit unions, or other financial institutions. In accordance with embodiments of the present invention, banking network 145 can use a variety of interaction methods, protocols, and systems. For example, banking network 145 can use any of the automated clearing house (ACH) networks. An ACH network may be operated by NACHA (previously referred to as the National Automated Clearing House Association). Another ACH network may be the Electronic Payments Network (EPN). These ACH networks may interact to settle ACH transactions involving a party that has a relationship with only NACHA's ACH network or only the EPN. Other banking networks, such as CIRRUS, NYCE, and PULSE may also be used.

As illustrated in FIG. 1, banking network 145 can be communicably coupled to one or more databases such as financial account database 150 and member database 155. These databases can have a variety of information that can be utilized by the insurance claims processing systems. For example, financial account database 150 can include account information (e.g., banking accounts, insurance policy information, etc) for members of a financial institution. Member database 155 can store information about members (or customers) of a membership organization (or financial institution). For example, membership database 155 can include information such as employer, total balance of all accounts held at the membership organization, credit ratings, home ownership information, annual salary, length of membership, and/or other information. In some embodiments, these two databases can be integrated into one database. A computer system associated with a membership organization, a bank, a credit union, or other financial institution within banking network 145 may be able to access these (and other) databases for account information, customer information, insurance information, and other stored information.

Figure 2:
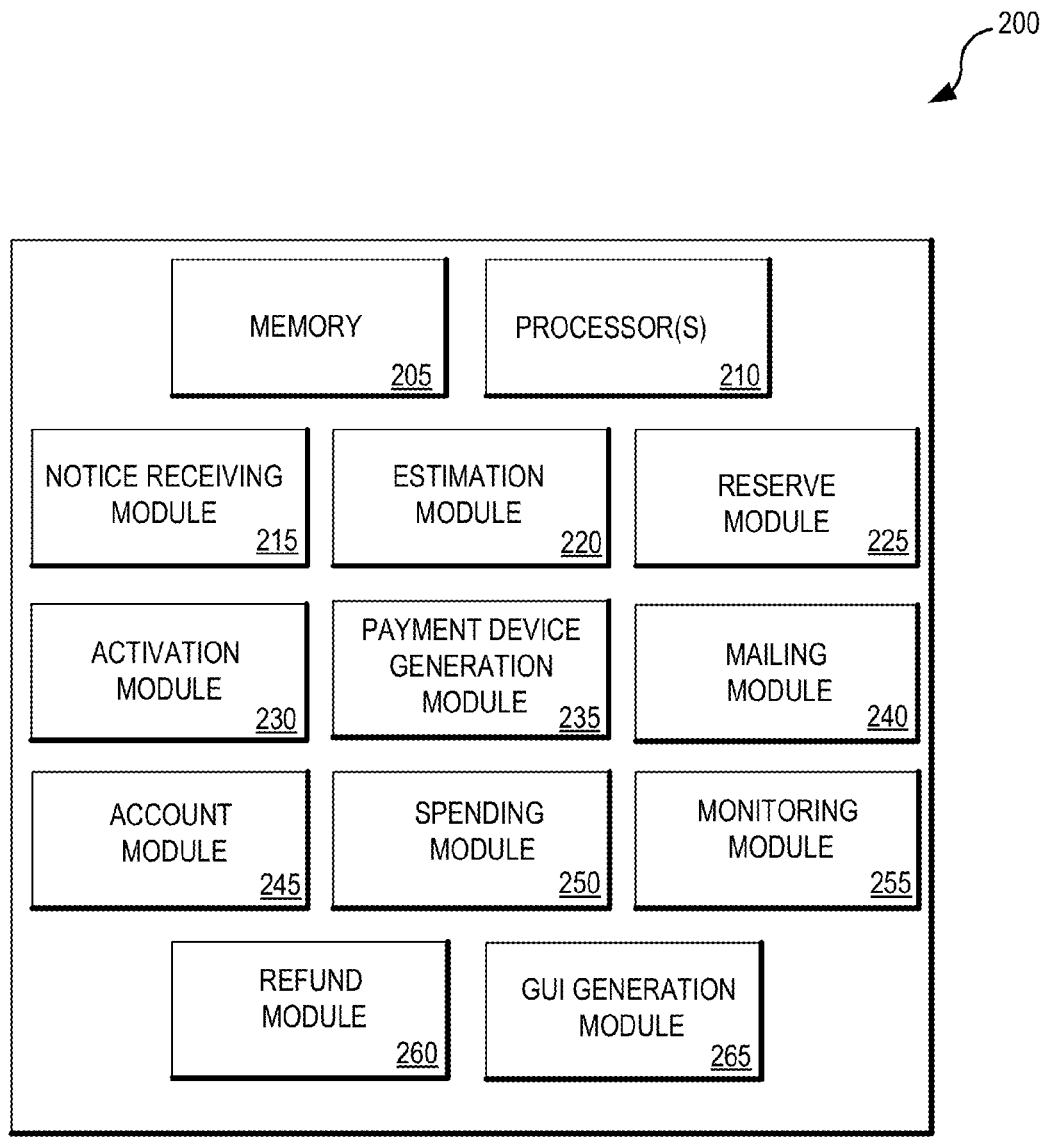
FIG. 2 is a block diagram illustrating exemplary components that can be included in an insurance claim system in accordance with one or more embodiments of the present invention.

FIG. 2 is a block diagram illustrating exemplary components that can be included in an insurance claim processing system 200 in accordance with one or more embodiments of the present invention. According to the embodiments shown in FIG. 2, the insurance claim processing system 200 can include memory 205, one or more processors 210, notice receiving module 215, estimation module 220, reserve module 225, activation module 230, payment device generation module 235, mailing module 240, account module 245, spending module 250, monitoring module 255, refund module 260, and GUI generation module 265. Other embodiments of the present invention may include some, all, or none of these modules and components along with other modules, applications, and/or components. Still yet, some embodiments may incorporate two or more of these modules into a single module and/or associate a portion of the functionality of one or more of these modules with a different module. For example, in one embodiment, the functionality associated with estimation module 220 and spending module 250 can be incorporated into a single financial module.

Memory 205 can be any device, mechanism, or populated data structure used for storing information. In accordance with some embodiments of the present invention, memory 205 can encompass any type of, but is not limited to, volatile memory, nonvolatile memory and dynamic memory. For example, memory 205 can be random access memory, memory storage devices, optical memory devices, media magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of notice receiving module 215, estimation module 220, reserve module 225, activation module 230, payment device generation module 235, mailing module 240, account module 245, spending module 250, monitoring module 255, refund module 260, and GUI generation module 265.

Notice receiving module 215 can receive a notice of loss with information about a loss relating to a member with insurance coverage provided by a membership institution. The notice of loss may be submitted by an insured member through a phone system, over the Internet, from a mobile device, or through a remote diagnostic system such as an intelligent home monitoring system, an automotive accident alert system, application, or custom interface. The notice of loss contains information about a claim, or potential claim, such as, but not limited to, type of loss, name of insured, policy number(s), parties involved, type of injuries, date, time, witness information, statements, police report numbers, hospital, towing company, and other information.

Estimation module 220 can receive information about the loss from the notice receiving module 215. Using this information, estimation module 220 can determine an expected loss amount based on historical claim data for similar losses. For example, this type of historical data may be stored within a claims database which can be accessed and processed by estimation module 220. In some embodiments, estimation module 220 can generate a set of typical claim categories (e.g., medical costs, repair costs, clothing costs, etc.) and typical claim category amounts for each category that is associated with the loss. In some cases, estimation module 220 will associate a confidence indicator with these categories. The confidence indicator can be used to determine a range of typical category claim amounts.

Estimation module 220, can communicate the expected loss amount and/or the typical claim categories, typical category amounts, and confidence indicators to reserve module 225. Based, at least in part, on this information reserve module can withdraw the expected loss amount from a reserve account of the membership institution. The expected loss amount can be capped by the coverage amount in some embodiments. In some cases, only a part of the expected loss amount may be initially withdrawn (e.g., a percentage).

Activation module 230 can activate a payment device with access to the expected loss amount withdrawn from the reserve account. The payment device allows the member to directly make loss related payments consistent with the insurance coverage. In some embodiments, an insurance card is activated as the payment device. In other embodiments, payment device generation module 235 orders the creation of a payment device in response to a generation indicator provided by the estimation module. Once the payment device is generated, payment device generation module 235 uses mailing module 240 to mail (or deliver electronically) the payment device to the member. In other embodiments, payment device generation module 235 generates a sixteen digit code or other electronically presented payment mechanism (e.g., 2D barcode, image, etc.) that can be delivered directly to a mobile device of the member. The electronically presented payment mechanism can then be used by the member for direct payment of loss related services.

In accordance with various embodiments, account module 245 can identify a banking account associated with the member (e.g., by accessing member database 155). Account module 245 can withdraw from the banking account any payment made with the payment device that is determined to not be a loss related payment. For example, spending module 250 can be used to monitor (e.g., with MCC data and level 3 data) the use of the payment device while a determination of liability is pending to ensure the payments are loss related payments. In the cases where typical claim categories and typical claim amounts are available, monitoring module 255 can categorize each transaction generated by the payment device and notify an auditor when spending within one or more of the claim categories exceeds a percentage of the typical claim amounts.

Refund module 260 determines a reserve refund amount by taking the difference between a final settlement amount and the expected loss amount withdrawn from the reserve account. Once the reserve refund amount is determined, refund module 260 can refund the reserve refund amount to the reserve account. Any remaining amount not yet spent by the insured member may be paid out via check, directly deposited into the member's banking account, and/or remain as available fund through use of the claims card.

Various embodiments of the present invention use GUI generation module 265 to generate one or more user interface screens. These user interface screens can be designed to receive user inputs, a notice of loss, policy information, communicate with a customer representative, and/or process other requests from the member.

Figure 3:
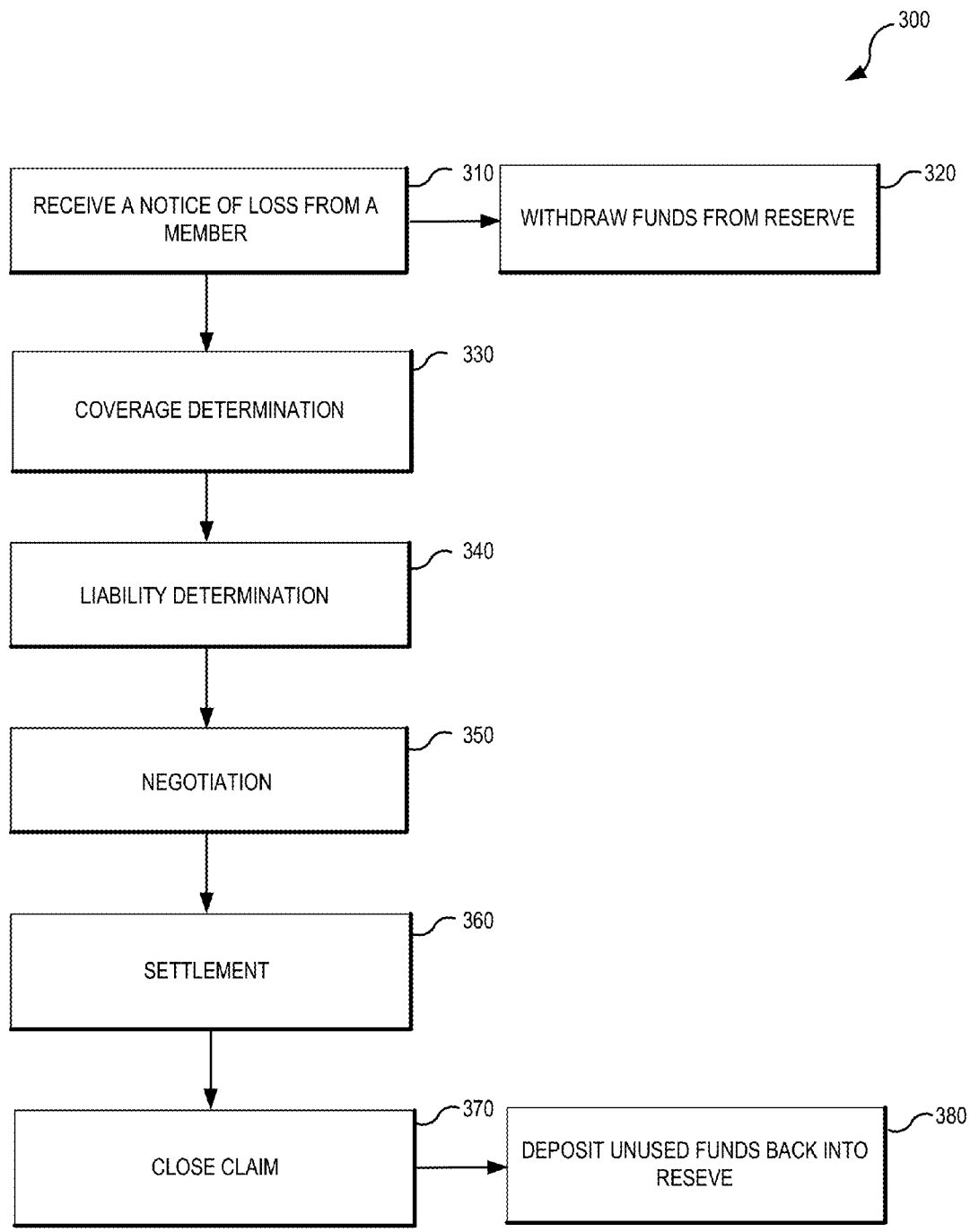
FIG. 3 is a flow chart illustrating a set of exemplary operations for processing a claim in accordance with embodiments of the present invention.

FIG. 3 is a flow chart illustrating a set of exemplary operations 300 for processing a claim in accordance with embodiments of the present invention. As illustrated in FIG. 3, a notice of loss is received from a member, communication device, or system during receiving operation 310. Upon receipt of a notice of loss, a withdrawal from the reserve fund can be made during withdrawal operation 320. The amount of the withdrawal can depend on a variety of factors. For example, the amount may be a small (or even zero) set amount until a coverage determination is made in coverage determination operation 330 and/or more information about the loss is obtained.

Once a coverage determination is made, a liability determination occurs during liability determination operation 340. The liability determination can be based on loss related facts (e.g., provided in the notice of loss), policy coverage and exclusions, fault of the member, as well as other factors. This determination can be completely or partially automated. In some embodiments, an adjuster can be sent out to investigate the loss during liability determination operation 340. In other cases, the system allows the member to submit additional information that may or may have been solicited. For example, the information may be submitted through a GUI screen generated by GUI generation module 265. Depending on the nature of the loss and if other parties are involved, a negotiation can occur during negotiation operation 350 to determine the final settlement amount. The negotiations can include the submission of all loss related expenses such as rental car expenses, medical expenses, and others.

Once the negotiations are completed, a settlement amount is finalized during settlement operation 360. Any remaining obligation under the insurance policy can be paid out. The claim is then closed during closure operation 370 and any remaining unused funds withdrawn from the reserve are deposited back into the reserve during refund operation 380.

Figure 4:
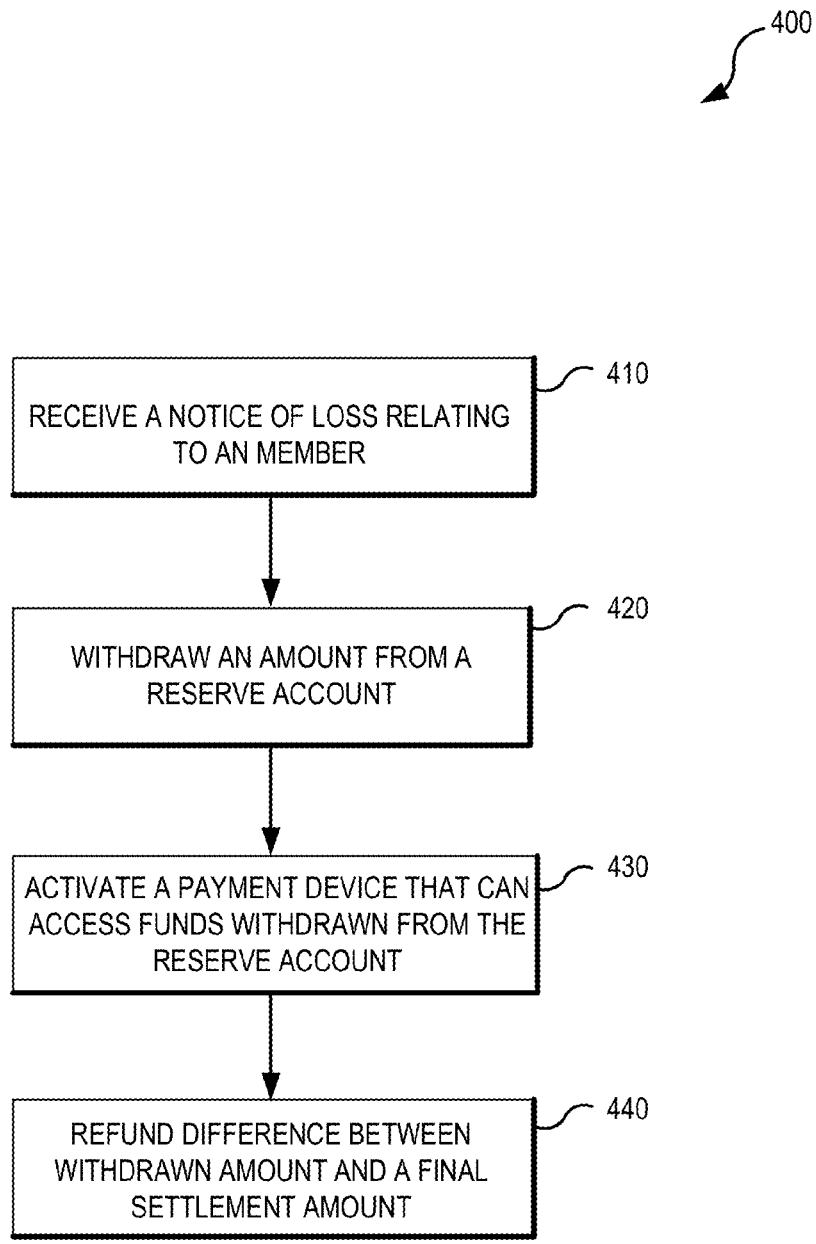
FIG. 4 is a flow chart illustrating a set of exemplary operations for electronically managing a reserve account in accordance with various embodiments of the present invention.

A reserve account is an account held by an insurance company with the amount of funds or assets needed to meet likely claims. The funds in the reserve account are typically invested. As such, minimizing the amount of funds withdrawn and the time period that fund are withdrawn can increase profits. FIG. 4 is a flow chart illustrating a set of exemplary operations 400 for electronically managing a reserve account in accordance with various embodiments of the present invention. Receiving operation 410 receives a notice of loss relating to an insured member. Withdrawal operation 420 withdraws an expected expense (e.g., as estimated by estimation module 220) amount from a reserve account. A payment device is activated during activation operation 430. The payment device allows the member to access all or a portion of the withdrawn funds. Any unused portion of the withdrawn funds can then be refunded to the reserve account during refund operation 440.

Figure 5:
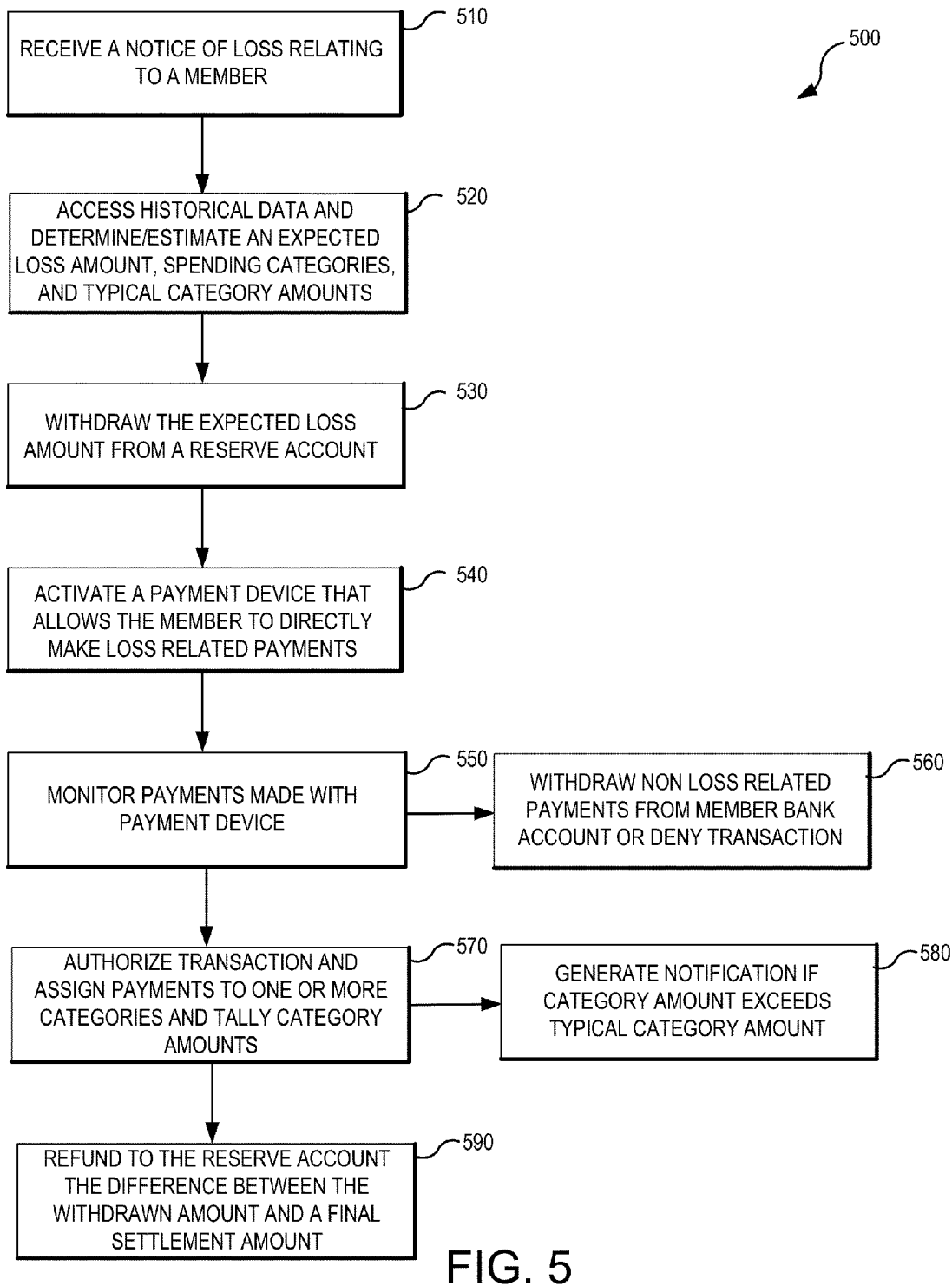
FIG. 5 is a flow chart illustrating a set of exemplary operations for processing a notice of loss with claims card transactions in accordance with some embodiments of the present invention.

FIG. 5 is a flow chart illustrating a set of exemplary operations 500 for processing a notice of loss with claims card transactions in accordance with some embodiments of the present invention. As shown in FIG. 5, a notice of loss can be received during receiving operation 510. The notice of loss relates to a member with insurance coverage provided by a membership institution. The insurance coverage typically has a maximum coverage amount.

In some embodiments the notice of loss is automatically generated by a remote diagnostic system or by a user through a graphical user interface or custom application. For example, a remote diagnostic system can be installed in an automobile that automatically generates the notice of loss in response to a notice generating event (e.g., a collision). The notice of loss can provide automobile information, membership information, and accident information gathered by the remote diagnostic system.

Estimation operation 520 generates an expected loss amount. The expected loss amount can be based on historical claim data from similar losses. In some cases, estimation operation 520 generates, determines (e.g., through a look up table), or receives spending categories and the typical amount spent in those categories for similar losses. Withdrawal operation 530 can withdraw from a reserve account of the membership institution the expected loss amount up to the coverage amount. The expected loss amount can be aggregated with other expected loss amounts in a general operating account or held separately in a member specific account.

Activation operation 540 activates a payment device. The payment device can be any mechanism allowing for the payment of services using the funds withdrawn from the reserve account. For example, in some embodiments, the payment device can be a membership card or an insurance card that was issued to the member. In other embodiments, the payment device can be an electronic payment system (e.g., a coupon, voucher, contactless payment device, etc.) that is electronically delivered to the member through network 140 (e.g., to a mobile phone, e-mail account, etc.). Once activated, generated, and/or delivered, the payment device allows the member to directly make loss related payments consistent with the insurance coverage.

Monitoring operation 550 monitors the use of the payment device while a determination of liability is pending. This allows the insurance provider to ensure the payments are loss related payments. For example, in some cases, the use of the payment device can be monitored using merchant category code (MCC) data and level 3 data. As another example, a membership database can be used to determine liability coverage, the coverage amount, and a member banking account at the membership institution. Any payment made with the payment device that is determined by monitoring operation 550 to not be a loss related payment can be withdrawn from the member banking account during payment return operation 560. In some embodiments, the transaction can be denied during the authorization process at the service provider or merchant. Still yet, monitoring operation 550 in some embodiments monitors the number of payments that are determined to be not related to the loss. A decision can be made to have a customer representative call the member to discuss the payments determined to be not related to the loss. In other cases, monitoring operation can determine the payment device is being abused (e.g., by exceeding a preset number of payments not related to the loss) and deactivate the payment device.

If the transaction is authorized, monitoring operation 550 branches to assignment operation 570 where the payment is assigned to one or more categories. A determination can be made if one or more category amounts have been exceeded. If one or more category payments exceed a percentage of the typical claim amount or a specific dollar amount, assignment operation 570 branches to notification operation 580 which generates a notification that is sent to an auditor or member support representative indicating the need for evaluation and/or monitoring of the claim.

The payment device can be monitored until a final settlement amount has been determined. Once the final settlement amount if finalized, a reserve refund amount can be computed which is the difference between the amount withdrawn from the reserve and the final settlement amount. The reserve refund amount is then refunded to the reserve account during refund operation 590.

Exemplary Computer System Overview

Figure 6:
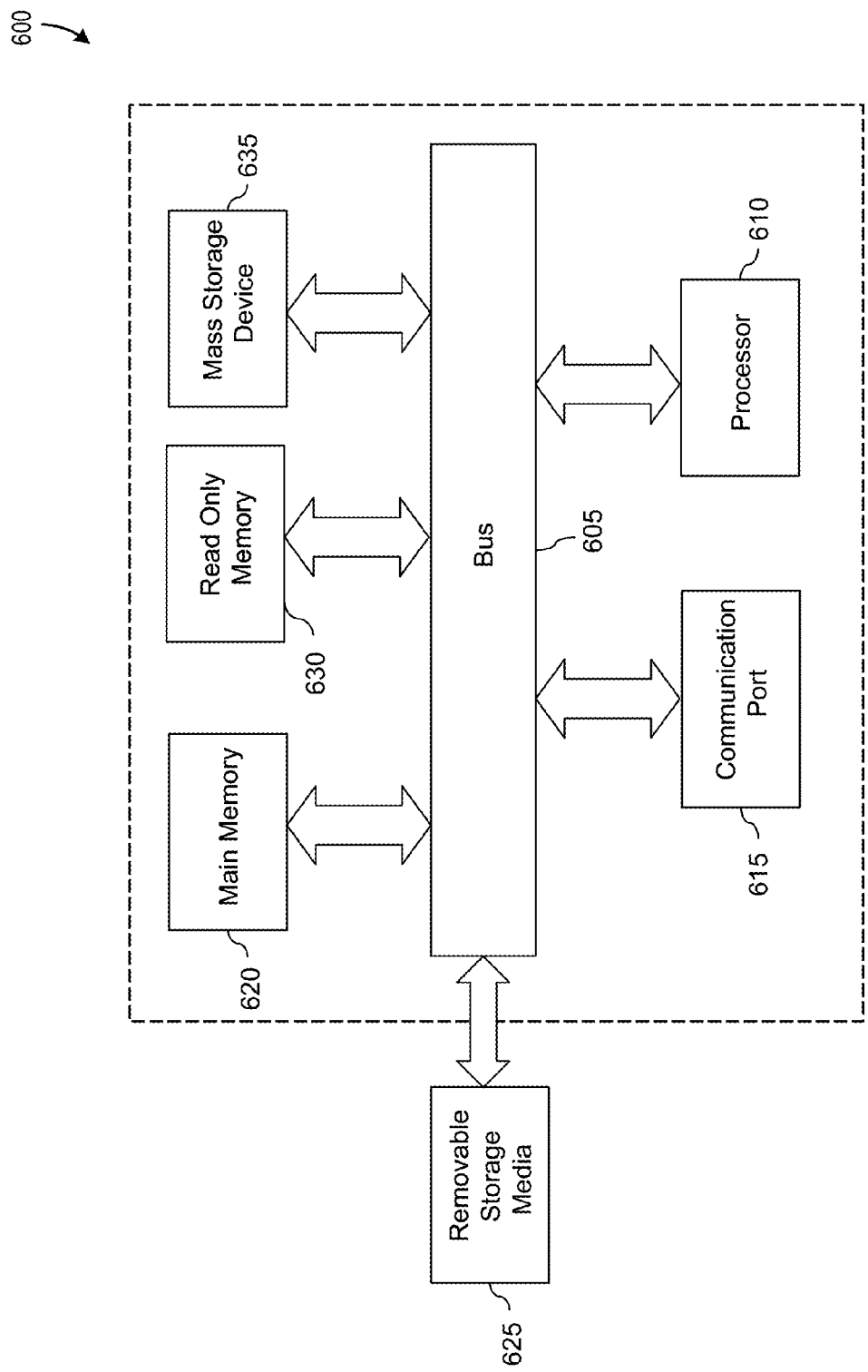
FIG. 6 illustrates an example of a computer system with which some embodiments of the present invention may be utilized.

Embodiments of the present invention include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600 with which embodiments of the present invention may be utilized. According to the present example, the computer system includes a bus 605, at least one processor 610, at least one communication port 615, a main memory 620, a removable storage media 625, a read only memory 630, and a mass storage 635.

Processor(s) 610 can be any known processor, such as, but not limited to, an Intel® Itanium® or Itanium 2® processor(s), or AMD® Opteron® or Athlon MP® processor(s), or Motorola® lines of processors. Communication port(s) 615 can be any of an RS-232 port for use with a modem based dialup connection, a 10/100 Ethernet port, or a Gigabit port using copper or fiber. Communication port(s) 615 may be chosen depending on a network such a Local Area Network (LAN), Wide Area Network (WAN), or any network to which the computer system 600 connects.

Main memory 620 can be Random Access Memory (RAM), or any other dynamic storage device(s) commonly known in the art. Read only memory 630 can be any static storage device(s) such as Programmable Read Only Memory (PROM) chips for storing static information such as instructions for processor 610.

Mass storage 635 can be used to store information and instructions. For example, hard disks such as the Adaptec® family of SCSI drives, an optical disc, an array of disks such as RAID, such as the Adaptec family of RAID drives, or any other mass storage devices may be used.

Bus 605 communicatively couples processor(s) 610 with the other memory, storage and communication blocks. Bus 605 can be a PCI/PCI-X or SCSI based system bus depending on the storage devices used.

Removable storage media 625 can be any kind of external hard-drives, floppy drives, IOMEGA® Zip Drives, Compact Disc-Read Only Memory (CD-ROM), Compact Disc-Re-Writable (CD-RW), and/or Digital Video Disk-Read Only Memory (DVD-ROM).

The components described above are meant to exemplify some types of possibilities. In no way should the aforementioned examples limit the scope of the invention, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, embodiments of the present invention are described with reference processing insurance payments, embodiments of the present invention are equally applicable to other payment obligations. Similarly, the user of the claims card need not be an insured member. For example, the user of the claims card can be someone injured by an insured member or someone otherwise in possession or control of damaged property for which the insurer is likely to be liable.

Also, for the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present invention provides novel systems, methods and arrangements for processing a notice of loss with claims card transactions. While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the appended claims.

What is claimed is:

1. A method comprising:
    receiving a notice of loss relating to a member with insurance coverage provided by a membership institution, wherein the insurance coverage has a coverage amount;
    withdrawing an amount from a reserve account of the membership institution upon receiving the notice of loss, wherein the amount to be withdrawn is based on historical claim data from similar losses and the coverage amount;
    activating a payment device with access to the amount withdrawn from the reserve account to allow the member to directly make loss related payments consistent with the insurance coverage; and
    refunding a reserve refund amount to the reserve account, wherein the reserve refund amount is the difference between a final settlement amount and the amount withdrawn from the reserve.

2. The method of claim 1, wherein the payment device is a membership card provided by the membership institution or an insurance card.

3. The method of claim 1, wherein the notice of loss is automatically generated by a remote diagnostic system.

4. The method of claim 3, wherein the remote diagnostic system is installed in an automobile and the notice of loss is automatically generated in response to a notice generating event, the notice of loss providing automobile information, membership information, and accident information gathered by the remote diagnostic system.

5. The method of claim 1, further comprising monitoring the use of the payment device while a determination of liability is pending to ensure the payments are loss related payments.

6. The method of claim 5, wherein monitoring the use of the payment device includes using merchant category code (MCC) data and level 3 data.

7. The method of claim 5, further comprising:
    accessing a membership database to determine liability coverage, the coverage amount, and a member banking account at the membership institution; and
    withdrawing from the member banking account any payment made with the payment device that is determined to not be a loss related payment.

8. A system comprising:
    a notice receiving module to receive a notice of loss with information about a loss relating to a member with insurance coverage provided by a membership institution;
    an estimation module to receive information about the loss from the notice receiving module, the estimation module to determine an expected loss amount based on historical claim data for similar losses;
    a reserve module to withdraw the expected loss amount from a reserve account of the membership institution;
    an activation module to activate a payment device with access to the expected loss amount withdrawn from the reserve account to allow the member to directly make loss related payments consistent with the insurance coverage; and a refund module to determine a reserve refund amount by taking the difference between a final settlement amount and the expected loss amount withdrawn from the reserve account, and the refund module to refund the reserve refund amount to the reserve account.

9. The system of claim 8, further comprising:

a member database having stored thereon information regarding the insurance coverage of a plurality of members and a member banking account at the membership institution; and an account module to identify the banking account associated with the member and withdraw any payment made with the payment device that is determined to not be a loss related payment.

10. The system of claim 8, further comprising a spending module to monitor the use of the payment device while a determination of liability is pending to ensure the payments are loss related payments.

11. The system of claim 10, wherein the spending module monitors the use of the payment device with merchant category code (MCC) data and level 3 data.

12. The system of claim 10, wherein the estimation module generates a set of typical claim categories and typical claim amounts for each category that associated with the loss, wherein the monitoring module categorizes each transaction generated by the payment devices and notifies an auditor when spending within one or more of the claim categories exceeds a percentage of the typical claim amounts.

13. The system of claim 8, wherein the payment device is a membership card provided by the membership institution.

14. The system of claim 8, further comprising:

a payment device generation module to create a payment device in response to a generation indicator provided by the estimation module; and a mailing module to mail the payment device to the member.

15. A computer-readable storage medium containing a set of instructions to cause one or more processors to:

receive a notice of loss relating to a member with insurance coverage provided by a membership institution, wherein the insurance coverage has a coverage amount;

withdraw an amount from a reserve account of the membership institution upon receiving the notice of loss, wherein the amount to be withdrawn is based on historical claim data from similar losses and the coverage amount;

activate a payment device with access to the amount withdrawn from the reserve account to allow the member to directly make loss related payments consistent with the insurance coverage; and refund a reserve refund amount to the reserve account, wherein the reserve refund amount is the difference between a final settlement amount and the amount withdrawn from the reserve.

16. The computer-readable storage medium of claim 15, wherein the set of instructions further cause the one or more processors to monitor the use of the payment device while a determination of liability is pending to ensure the payments are loss related payments.

17. The computer-readable storage medium of claim 16, wherein monitoring the use of the payment device includes using merchant category code (MCC) data and level 3 data.

18. The computer-readable storage medium of claim 16, wherein the set of instructions further cause the one or more processors to:

access a membership database to determine liability coverage, the coverage amount, and a member banking account at the membership institution; and withdraw from the member banking account any payment made with the payment device that is determined to not be a loss related payment.

19. The computer-readable storage medium of claim 15, wherein the set of instructions further cause the one or more processors to:

generate a set of typical claim categories each having a typical claim amount associated with the loss;

categorize each transaction generated by the payment device; and notify an auditor when spending within one or more of the claim categories exceeds a percentage of the typical claim amount.

20. The computer-readable storage medium of claim 15, wherein the set of instructions further cause the one or more processors to:

receive a transaction request to process a payment to a merchant generated by use of the payment device;

determine if the payment is a loss related payment; and denying the transaction request if the payment is determined to not be a loss related payment.

* * * * *